US012617890B2

(12) United States Patent
Tran et al.

(10) Patent No.: US 12,617,890 B2
(45) Date of Patent: May 5, 2026

(54) POLYURETHANE MULTI-PART KIT SYSTEM

(71) Applicant: LANXESS SOLUTIONS AUSTRALIA PTY. LTD., New South Wales (AU)

(72) Inventors: Loc Tran, Victoria (AU); Brett Budd, New South Wales (AU)

(73) Assignee: LANXESS SOLUTIONS AUSTRALIA PTY. LTD., New South Wales (AU)

( * ) Notice: Subject to any disclaimer, the term of this patent is extended or adjusted under 35 U.S.C. 154(b) by 764 days.

(21) Appl. No.: 17/798,105

(22) PCT Filed: Feb. 5, 2021

(86) PCT No.: PCT/AU2021/050093
§ 371 (c)(1),
(2) Date: Aug. 8, 2022

(87) PCT Pub. No.: WO2021/155440
PCT Pub. Date: Aug. 12, 2021

(65) Prior Publication Data

US 2023/0130041 A1 Apr. 27, 2023

Related U.S. Application Data

(60) Provisional application No. 62/971,275, filed on Feb. 7, 2020.

(51) Int. Cl.

| | |
|---|---|
| ***C08G 18/10*** | (2006.01) |
| ***B29C 73/02*** | (2006.01) |
| ***B29C 73/26*** | (2006.01) |
| ***B65G 15/32*** | (2006.01) |
| ***C08G 18/22*** | (2006.01) |
| ***C08G 18/24*** | (2006.01) |
| ***C08G 18/32*** | (2006.01) |
| ***C08G 18/48*** | (2006.01) |
| ***C08G 18/76*** | (2006.01) |
| ***C08K 3/36*** | (2006.01) |
| ***C08K 5/42*** | (2006.01) |
| ***C09D 175/08*** | (2006.01) |

(52) U.S. Cl.

CPC ............. *C08G 18/10* (2013.01); *B65G 15/32* (2013.01); *C08G 18/227* (2013.01); *C08G 18/242* (2013.01); *C08G 18/3215* (2013.01); *C08G 18/4833* (2013.01); *C08G 18/4854* (2013.01); *C08G 18/7671* (2013.01); *C08K 3/36* (2013.01); *C08K 5/42* (2013.01); *C09D 175/08* (2013.01); *B29C 73/02* (2013.01); *B29C 2073/262* (2013.01); *C08K 2201/003* (2013.01)

(58) Field of Classification Search

CPC .... C08G 18/10; C08G 18/227; C08G 18/242; C08G 18/3215; C08G 18/4833; C08G 18/4854; C08G 18/7671; B65G 15/32; C08K 3/36; C08K 5/42; C08K 2201/003; C09D 175/08; B29C 73/02; B29C 2073/262

See application file for complete search history.

(56) References Cited

U.S. PATENT DOCUMENTS

| | | | | |
|---|---|---|---|---|
| 4,327,138 | A | 4/1982 | Hausch | |
| 4,345,058 | A | 8/1982 | Dettling | |
| 4,415,469 | A | 11/1983 | Tsai | |
| 5,955,559 | A | 9/1999 | Handlin, Jr. et al. | |
| 7,387,819 | B2 | 6/2008 | Emch et al. | |
| 2007/0231156 | A1 | 10/2007 | Hong | |
| 2009/0076239 | A1 | 3/2009 | Xie et al. | |
| 2016/0040050 | A1 | 2/2016 | Munoz et al. | |
| 2016/0060382 | A1* | 3/2016 | Mahdi | C08G 18/10 525/453 |
| 2016/0312090 | A1 | 10/2016 | Kulkarni et al. | |
| 2017/0182743 | A1* | 6/2017 | Cribb | E21B 43/00 |
| 2018/0148534 | A1 | 5/2018 | Zhu et al. | |
| 2019/0352230 | A1 | 11/2019 | Santos et al. | |
| 2020/0002585 | A1* | 1/2020 | Power | C08G 18/4841 |
| 2020/0131414 | A1 | 4/2020 | Grunder et al. | |
| 2023/0130041 | A1 | 4/2023 | Tran et al. | |

FOREIGN PATENT DOCUMENTS

| | | | |
|---|---|---|---|
| AU | 2011297666 | A | 3/2012 |
| CN | 106608962 | A | 5/2017 |
| CN | 109294213 | A | 2/2019 |
| CN | 111040227 | A | 4/2020 |
| CN | 117186828 | A | 12/2023 |

(Continued)

OTHER PUBLICATIONS

Cabot (Year: 2014).*
Millathane 55 Data Sheet (Year: 2015).*
Cabot, "Cab-O-Sil Treated Fumed Silica for Polyols Used in Polyurethanes", Brochure, retrieved from the Internet on Apr. 8, 2024 at www.cabotcorp.com.
International Search Report from corresponding International Application No. PCT/AU2021/050093, dated Apr. 20, 2021, three pages.
European Search Report from corresponding European Application No. 20164084 dated Jul. 23, 2020, two pages.
Millathane-55 Bulletin, TSE Industries, Inc., retrieved from Internet on Aug. 3, 2022 at www.tse-industries.com/sites/default/files/ data-msds-brochures/Millathane-55_Bulletin, published on Jun. 4, 2015 pp. 1-4.

(Continued)

*Primary Examiner* — Robert S Jones, Jr.
*Assistant Examiner* — Elizabeth Amato
(74) *Attorney, Agent, or Firm* — Oblon, McClelland, Maier & Neustadt, L.L.P.

(57) ABSTRACT

A multi-part kit system may be used to repair damaged products used in industrial applications, comprising a part A which includes (A1) MDI prepolymer, (A2) fumed silica, and (A3) plasticizer; a part B which includes (B1) hydroquinone di-(2-hydroxyethyl)ether and (B2) plasticizer; and a part C which includes (C1) polyol, (C2) optionally, catalyst, and (C3) optionally, plasticizer.

20 Claims, No Drawings

(56) References Cited

FOREIGN PATENT DOCUMENTS

| | | | | | |
|---|---|---|---|---|---|
| CN | 118652466 | B | | 11/2024 | |
| CN | 120230270 | A | | 7/2025 | |
| CN | 120248818 | A | | 7/2025 | |
| EP | 0 829 497 | A1 | | 3/1998 | |
| EP | 4 578 902 | A1 | | 7/2025 | |
| EP | 4 593 601 | A | | 8/2025 | |
| JP | 3-67529 82 | | | 10/1991 | |
| JP | 2004-182997 | A | | 7/2004 | |
| JP | 3774559 | B2 | | 5/2006 | |
| JP | 5279249 | B2 | | 9/2013 | |
| KR | 91-12049 | A | | 8/1991 | |
| KR | 97-42641 | A | | 7/1997 | |
| KR | 10-2286724 | B1 | | 8/2021 | |
| WO | WO-2017194034 | A1 | * | 11/2017 | ............. C08G 18/32 |
| WO | WO-2019/013917 | A1 | | 1/2019 | |
| WO | WO-2019/076843 | A1 | | 4/2019 | |
| WO | WO 2024/069490 | A1 | | 4/2024 | |

OTHER PUBLICATIONS

Combined Colombian Office Action and Search Report issued Sep. 22, 2025 in Colombian Patent Application No. NC2022/0012755 (with English translation), 17 pages.

Office Action issued Oct. 28, 2025, in Mexican Patent Application No. MX/a/2022/009666 with machine generated English translation (18 pages).

Monument Chemical "Technical Product Information: Poly-G HQEE® Aromatic Diol", Mar. 2013 (4 pages).

Office Action dated Mar. 3, 2026, in Columbian Patent Application No. 20220012755 with machine English transalation 22 pages.

* cited by examiner

POLYURETHANE MULTI-PART KIT SYSTEM

CROSS-REFERENCE TO RELATED APPLICATIONS

The present application is the national stage of international application PCT/AU2021/050093, filed on Feb. 5, 2021, and claims the benefit of the filing date of U.S. Prov. Appl. No. 62/971,275, filed on Feb. 7, 2020, the content of each of which is incorporated by reference.

FIELD OF THE INVENTION

This invention relates to a multi-part kit system to repair damaged products used in industrial applications, comprising a part A which comprises A1) MDI prepolymer, A2) fumed silica and A3) plasticizer; a part B which comprises B1) hydroquinone di-(2-hydroxyethyl)ether and B2) plasticizer; and a part C which comprises C1) polyol, C2) optionally catalyst and C3) optionally plasticizer.

BACKGROUND OF THE INVENTION

Elastomeric and rigid polymeric repair kits are used throughout many industries especially mining, quarries and marine. Products made from metal, plastic, elastomers and other engineering materials, might be damaged by abrasion, erosion or impact when used in their intended operational environments. Product damage results in reduced operating efficiencies, lost production, increased worker risk and cost increases. Removal and transporting the damaged products for repair, further compounds costs and inconvenience.

Repair systems, which allow the repair of damaged product surfaces on site and/or in situ are therefore often used to get equipment back into service in short periods of time, preferably within 24 hours. The repaired equipment shall function until the repaired part can be easily replaced, e.g. during a non-production phase or during scheduled maintenance periods.

There are several of repair systems disclosed in the prior art.

US-A-2016312090 discloses a kit for repairing a defect in an elastomer comprising: a two part adhesive formulation of a Part A comprising: polyol, an adhesion promoter, a chain extender, a catalyst, a water scavenger; and a Part B comprising: polyurethane prepolymer, adhesion promoter and a plasticizer.

US-A-2016040050 discloses a polyurethane-based composition which includes a polyurethane prepolymer, a solvent, a plasticizer and a curing agent, wherein the curing agent contains a mononuclear aromatic polyamine, and is present in an amount such that the molar ratio of all amine functions in the polyamine to all isocyanate functions in the composition is at least 0.7 to 1.

U.S. Pat. No. 4,345,058 discloses a urethane prepolymer repair system provided by an isocyanate-terminated polytetramethylene ether glycol prepolymer of about 3,500-10,500 molecular weight that cures to an elastomer upon exposure to atmospheric moisture.

U.S. Pat. No. 4,327,138 discloses a composition for applying and bonding a curable prepolymer, for example, an amine curable prepolymer, at ambient temperatures to the surface of a cured elastomer substrate. The elastomer article or substrate is treated with an organic oxidant.

AU-B-2011297666 discloses a chemical composition to be used in reconstruction and recovery of worn rubber surfaces comprising a crosslinkable polyurethane prepolymer based on a toluene diisocyanate (TDI) in a ratio between 74 to 87% in weight of the final composition, a solvent, a dye and a diethylmethylbenzenodiamine (DETDA) catalyst.

U.S. Pat. No. 7,387,819 discloses a method of repairing a vehicle bed-liner including depositing a two-component patching material. The polyurea patching composition comprises two parts comprising IPDI, amines and filler.

WO-A-2017/194034 discloses a three-component plasticized conventional polyester polyurethane elastomer derived from a polyester MDI-prepolymer, a polyester polyol and hydroquinone di-(2-hydroxyethyl)ether (HQEE).

US-A-2007/0231156 discloses an airfoil repair kit comprising an elastomeric repair material such as polyurethanes.

Repair kits are available in the prior art that require typically approximately 30 to 45 minutes working time and enable the repaired equipment to be returned to service after 24 hours. However, the materials which are applied are typically hazardous.

It was thus an object of the invention to provide a repair kit for on-site repair which is easy and safe to use, which is fast curing at room temperature, which can be troweled immediately once put in place, allows the device being returned to service after a minimum of 3 hours, which has improved hydrolytic stability in environments in the range of 50 to 85° C. and which is weather resistant (e.g. UV and improved color stability). It was also an object that the properties of the repair material need to suit the target application.

One further object is that the repair kit can be applied easily over a longitudinal damage, such as a groove in a conveyor belt without flowing or changing shape.

One further object is, that the repair kit is low-hazardous and thus can be applied with reduced environmental health and safety concerns compared to other repair kits.

SUMMARY OF THE INVENTION

The problem was solved by providing a multi-part kit system comprising (i) a part A which comprises
 A1) MDI prepolymer,
 A2) fumed silica and
 A3) plasticizer;
(ii) a part B which comprises
 B1) hydroquinone di-(2-hydroxyethyl)ether and
 B2) plasticizer; and
(iii) a part C which comprises
 C1) polyol,
 C2) optionally catalyst and
 C3) optionally plasticizer.

The use of the multi-part kit system is easy as parts A, B and C are correctly proportioned and just need to be mixed to create the repair material without any special requirements. The components are classified as non-hazardous or less hazardous than components based on conventional polyurethane repair products and thus do not require specially skilled operators. Using just parts A and B allows the product to be used in its castable form. Adding part C marks the material thixotropic and trowelable.

The cure rates are fast and thus reduces the downtime of the equipment, as the device can be returned to service already after a minimum of 3 hours at room temperature.

DETAILED DESCRIPTION OF THE INVENTION

It must be noted that as used herein, the singular forms "a", "an" and "the" include plural references and vice versa unless the context clearly indicates otherwise.

Unless otherwise indicated, the term "at least" preceding a series of elements is to be understood to refer to every element in the series. Those skilled in the art will recognize, or be able to ascertain using no more than routine experimentation, many equivalents to the specific embodiments of the present invention described herein. Such equivalents are intended to be encompassed by the present invention.

The term "and/or" wherever used herein includes the meaning of "and", "or" and "all or any other combination of the elements connected by said term". For example, A, B and/or C means A, B, C, A+B, A+C, B+C and A+B+C.

The term "about" or "approximately" as used herein means within 20%, preferably within 10%, and more preferably within 5% of a given value or range. It includes also the concrete number, e.g., about 20 includes 20.

The term "less than", "more than" or "larger than" includes the concrete number. For example, less than 20 means <20 and more than 20 means >20.

Throughout this specification and the claims or items, unless the context requires otherwise, the word "comprise" and variations such as "comprises" and "comprising" will be understood to imply the inclusion of a stated integer (or step) or group of integers (or steps).

It does not exclude any other integer (or step) or group of integers (or steps). When used herein, the term "comprising" can be substituted with "containing", "composed of", "including", "having" or "carrying." When used herein, "consisting of" excludes any integer or step not specified in the claim/item. When used herein, "consisting essentially of" does not exclude integers or steps that do not materially affect the basic and novel characteristics of the claim/item. In each instance herein any of the terms "comprising", "consisting essentially of" and "consisting of" may be replaced with either of the other two terms.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The term "multi-part kit system" or "three-part kit system" is used in the description and the claims. It means a kit system comprised of several or three parts which are stored separately from each other until being used; i.e., until the parts are mixed to form the curable composition.

The term "working time" as used in the present invention, in the context of using the product as a castable repair kit, is the time from mixing of the components of the multi-part kit system until it is too thick to flow and can no longer be defined as a liquid. i.e. that the curable composition starts to polymerize.

The term "working time" as used in the present invention, in the context of using the product as a trowelable repair kit, is the time from mixing of the components of the multi-part kit system until it gains memory and tends to return to an original position when deformed, i.e. that the curable composition starts to polymerize and gains some memory.

The term "return to service" as used in the present invention means that 80% of the final physical properties, particularly hardness, are reached at room temperature.

In referring to the components of a particular part of a multi-part kit, unless otherwise indicated, the weight % (wt %) of the component is based on the total weight of that particular part. For example, the wt % of the components of Part A is based on the total weight of Part A and so forth for the other parts.

The term "room temperature" refers to a temperature of 25° C.±2° C.

The Part A

The part A of the multi-part kit system of the present invention comprises

A1) MDI prepolymer,

A2) fumed silica and

A3) plasticizer.

A1) MDI Prepolymer

Part A of the present invention comprises MDI prepolymer A1.

In one embodiment of the present invention, the MDI prepolymer of the present invention is an isocyanate-terminated prepolymer obtainable by the reaction of 4,4'-methylene diphenyl diisocyanate (MDI) with a polyol.

The present invention is not limited by the use of a particular polyol in the MDI prepolymer. A polyol suitable for the present invention used in the preparation of the MDI prepolymer may be selected from any polyol known in the art. Such polyols include compounds having more than one hydroxyl groups. Thus, polyols suitable for the present invention comprise diols, triols, and/or higher average hydroxyl functionality. Such polyols are well known in the art and more than one may be used. The formation of such polyols is well known in the art.

In many embodiments, diols are preferred over triols or polyols with higher hydroxyl functionality.

In some embodiments of the present invention, the polyol of the MDI prepolymer comprises at least one polyester polyol, at least one polyether polyol, at least one polycaprolactone polyol, at least one polycarbonate polyol, or combinations thereof.

In a preferred embodiment, the polyol of the MDI prepolymer is polyether polyol. Prepolymers based on polyether polyol show good resistance to hydrolytic cleavage and excellent dynamic properties.

In a preferred embodiment, the polyol of the MDI prepolymer is polytetramethylene ether glycol (PTMEG).

In a preferred embodiment, the amount of free 4,4'-methylene diphenyl diisocyanate (MDI) monomer in the MDI prepolymer A1 is less than 1 wt %, more preferably less than 0.5 wt %, even more preferably less than 0.1 wt %, based on the total weight of the prepolymer A1. Unreacted free MDI monomer is removed via typical means, e.g. distillation.

In a particularly preferred embodiment, the amount of unreacted MDI monomers in the MDI prepolymer is less than 0.08 wt % based on the total weight of the prepolymer.

The use of MDI prepolymer A1 with less than 1 wt %, preferably less than 0.1 wt %, free MDI monomer based on the total weight of the MDI prepolymer makes it possible to provide safer products.

The MDI prepolymer is present in part A in an amount of 70 to 85 wt %, preferably 75 to 80 wt %, based on the total weight of the part A.

The MDI prepolymer A1 of the present invention is less hazardous than conventional MDI prepolymers and also other MDI products because of the very low free (LF) MDI levels and the fact that MDI has much lower vapor pressure compared to other isocyanate monomers (e.g. toluene diisocyanate (TDI), hexamethylene diisocyanate (HDI), etc.).

A2) Fumed Silica

Part A of the present invention comprises fumed silica A2. In one embodiment of the present invention, the fumed silica A2 of part A of the present invention is pyrogenic silica (CAS number 112945-52-5).

The fumed silica A2 is present in part A in an amount of 2 to 10 wt %, preferably 3 to 7 wt %, based on the total weight of the part A.

The fumed silica A2 is commercially available from Evonik under the tradename Aerosil or from Wacker under the tradename HDK® N20.

A3) Plasticizer

Part A of the present invention comprises at least one plasticizer A3.

In one embodiment of the present invention, the plasticizer of part A of the present invention is an alkylsulphonic phenyl ester or dipropylene glycol dibenzonate.

The plasticizer A3 is present in part A in an amount of 10 to 25 wt %, preferably 13 to 17 wt %, based on the total weight of the part A.

The Part B

The part B of the multi-part kit system of the present invention comprises

B1) hydroquinone di-(2-hydroxyethyl)ether and

B2) plasticizer.

B1) Hydroquinone di-(2-hydroxyethyl)ether

Part B of the present invention comprises hydroquinone di-(2-hydroxyethyl)ether (HQEE) B1.

In one embodiment of the present invention, hydroquinone di-(2-hydroxyethyl)ether (HQEE) is present in solid particulate form, preferably as ground powder. HQEE can be ground with any suitable mill, for example a ball mill or a three roll mill. In one embodiment, the particle diameter D90 (the diameter where ninety percent of the distribution has a smaller particle size and ten percent has a larger particle size) is less than 90 micrometer, preferably less than 30 micrometer and more preferably less than 10 micrometer. The particle diameter D90 is measured according to ASTM E2651.

The HQEE is present in part B in an amount of 25 to 50 wt %, preferably 28 to 38 wt %, based on the total weight of the part B.

B2) Plasticizer

Par B of the present invention comprises a plasticizer B2.

In one embodiment of the present invention, the plasticizer of part B of the present invention is an alkylsulphonic phenyl ester. Alkylsulphonic phenyl ester is hydrophobic and, thus, tends to repel water from the atmosphere that can complicate the cure reaction. Alkylsulphonic phenyl ester is commercially available from LANXESS under the tradename Mesamoll®.

The plasticizer is present in part B in an amount of 50 to 75 wt %, preferably 62 to 72 wt %, based on the total weight of the part B.

In one embodiment of the present invention, part A and part B comprise the same plasticizer, preferably alkylsulphonic phenyl ester.

Part B of the present invention is prepared by grinding the components together achieving a paste of particular particle size. This enables the use of solid curatives that are typically unreactive at room temperatures.

It is an essence of the invention is that MDI prepolymer is cured with HQEE in plasticizer, preferably particulate HQEE in alkylsulphonic phenyl ester such as Mesamoll® to make the paste. The combinations of these components is also possible in cold cast applications, e.g. curable polyurethane prepolymer compositions which are cured at temperatures between 0 and 40° C., preferably at room temperature.

The Part C

The part C of the multi-part kit system of the present invention comprises

C1) polyol and

C2) optionally a catalyst and

C3) optionally plasticizer.

C1) Polyol

Part C of the present invention comprises a polyol C1.

The polyol C1 of the present invention may include a diol or a triol or combinations thereof.

In one embodiment, the polyol C1 is selected from a group consisting of polyester polyol, polyether polyol, polycaprolactone polyol, and polycarbonate polyol.

In a preferred embodiment, the polyol C1 is a polyalkylene glycol.

The polyalkylene glycol may be generally represented as a group of formula (I):

(I)

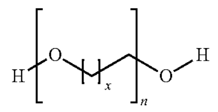

In the formula (I), each x is individually an integer, and each n is individually an integer.

In one embodiment, x is 0, 1, 2, 3, 4, 5, or 6. The n values merely indicate a polymer repeat unit that may be 1 or 2 or extend for tens or hundreds of units to reach a target polymer molecular weight.

Illustrative values for each individual n include, but are not limited to any integer including 1 and up to and including 10,000. For example, n may be any integer including 1 and up to and including 9,000; 1 and up to and including 8,000; 1 and up to and including 7,000; 1 and up to and including 6,000; 1 and up to and including 5,000; 1 and up to and including 4,000; 1 and up to and including 3,000; 1 and up to and including 2,000; 1 and up to and including 1,000; or 1 and up to and including 500.

The term polyalkylene glycol according to the present invention may include, but is not limited to polymethylene glycol, polyethylene glycol (PEG), polypropylene glycol (PPG), polybutylene glycols (a single isomer thereof or a mixture of isomers) (PBG), polypentylene glycols (a single isomer thereof or a mixture of isomers) (PBG), polyhexylene glycols (mixtures of isomers), or a mixture of any two or more thereof.

In a preferred embodiment, the polyol C1 of the present invention is a polyethylene glycol (PEG).

In more preferred embodiment of the present invention, the polyol C1 of the present invention is a polyethylene glycol which has preferably a molecular weight of 180 to 220 g/mol, more preferably 195 to 205 g/mol and in particular 200 g/mol.

The polyol C1 is present in part C in an amount of 10 to 35 wt %, preferably 20 to 26 wt %, based on the total weight of the part C.

C2) Catalyst

Part C of the present invention optionally comprises at least one catalyst.

In one embodiment of the present invention, part C comprises a catalyst.

The type of the catalyst is no limited.

In one embodiment of the present invention, the catalyst C2 of part C is a catalyst composition comprising more than one catalytic component.

In another embodiment of the present invention, the catalyst C2 of part C is a formulated catalyst composition comprising a tin catalyst and a bismuth catalyst.

In one embodiment of the present invention, the catalyst C2 of part C is a composition comprising 80 to 99 wt % plasticizer and 1 to 20 wt % tin catalyst.

In one embodiment of the present invention, the catalyst of part C is a composition of 95% Benzoflex™ 9-88 SG plasticizer and two tin catalysts 3.33% Niax® A33 and 1.67% Niax® A577 (commercially available from LANXESS under the tradename Vibracat® MF) and bismuth catalyst BiCAT® 8108.

In one embodiment of the present invention, part C comprises 2 to 15 wt % catalyst, based on the total amount of part C.

In one embodiment of the present invention, the part C comprises 1 to 2 parts PEG 2000, 5 to 10 parts Vibracat® MF and 0.1 to 0.5 parts catalyst C2.

C3) Plasticizer

Part C of the present invention optionally comprises at least one plasticizer C3.

In one embodiment of the present invention, part C comprises a plasticizer. In a particular embodiment of the present invention, said plasticizer of part C of the present invention is an alkylsulphonic phenyl ester.

The plasticizer C3 is optionally present in part C in an amount of 10 to 75 wt %, preferably 30 to 50 wt %, based on the total weight of the part C.

In one embodiment of the present invention, part A and/or part B and/or part C comprise the same plasticizer, preferably alkylsulphonic phenyl ester.

In some embodiments of the present invention, the multi-part kit systems further comprises pigment in one or more of the parts A, B or C.

In one embodiment, the weight ratio of part A to part B to part C is 100:15:1 to 100:50:15.

In one embodiment of the present invention, part A or B or C or both comprise no solvent. The use of solvent is disadvantageous as it will cause environmental health and safety (EHS) issues.

Preferred multi-part kit systems of the present invention comprise (i) a part A composed according to its preferred embodiment and (ii) a part B also composed according to its preferred embodiment and (iii) a part C also composed according to its preferred embodiment.

Preferred three-part kit systems of the present invention consist of (i) a part A composed according to its preferred embodiment and (ii) a part B also composed according to its preferred embodiment and (iii) part C also composed according to its preferred embodiment.

Particularly preferred three-part kit systems of the present invention comprise (i) a part A composed according to its particular embodiment and (ii) a part B composed according to its particular embodiment and (iii) a part C composed according to its particular embodiment.

It is preferred that parts A, B and C of the three- or multi-part kit system of the present invention are such, i.e. composition and packaging sizes of parts A, B and C are preferably such, that upon mixing with each other the weight ratio between the parts A, B and C is 100:20:1 to 100:50:10.

The three- or multi-part kit system of the present invention; i.e., in particular, the part A, part B and the part C, can be shipped to the user where the individual parts can be stored separate from each other until being used for the preparation of the curable composition. Both parts A B and C have a long shelf life of, for example, at least 6 to 24 months, if stored in a dry and cool place, not exceeding 25° C.

Process for the Preparation of a Curable Composition

The invention is also directed to a process for the preparation of a curable composition by mixing all parts of the multi-part kit system, in particular mixing part A, part B and part C.

The process of the present invention can be performed at a user's premises. It is preferred that the multi or three-part kit system of the present invention is supplied to the user in the form of separate receptacles, one of which contains the part A and another receptacle or, the other receptacle, contains the part B and the third receptacle part C.

The preparation of the curable composition can easily be performed by mixing parts A and B in the desired mixing ratio. Once mixed, part C is added and mix completely through parts A+B.

Curable Composition

The invention is also directed to a curable composition, comprising the parts of the multi-part kit system.

When the components of the parts A and B of the multi-part kit system are mixed, a castable thick liquid is formed which can then be poured on a variety of surfaces.

When the components of the parts A and B and C of the multi-part kit system are mixed, a thixotropic putty is formed which can then be applied to a variety of surfaces in thickness from 1 mm to 25 mm. The inherent thixotropic properties allow thick coatings to be applied to vertical surfaces or the underside of horizontal surfaces without slumping, changing shape or falling off.

Process to Repair a Damaged Surface

Such curable composition can then be used for repair purposes. The invention is also directed to a process to repair a damaged surface comprising the steps of a) abrading the area of the substrate to be repaired, to provide an abraded substrate,
b) cleaning the surface of the abraded substrate, preferably using a solvent, to provide an abraded, cleaned substrate,
c) optionally applying a primer to the surface of the abraded, cleaned substrate,
d) mixing part A and part B of the present invention to form a curable composition,
e) optionally mixing part C of the present invention with the curable composition of step d)
f) applying the curable composition of step d) or step e) onto the surface of the abraded, cleaned substrate,
h) curing the applied curable composition at a temperature of 15° C. or more.

The surface of a substrate can be damaged in any way, including being abraded, eroded, cracked, scratched, punched, slit, perforated or cut.

The curable composition can be applied by any means. In one embodiment, the curable composition can be applied by troweling with or without the use of an applicator such as a spatula.

In one embodiment of the present invention, part A is provided in a receptacle A and part B of the present invention is provided in receptacle B, wherein the receptacle of part A is able to receive the volume of part B.

In one embodiment of the present invention, part B is added to part A by using a spatula.

In one embodiment of the present invention, the damaged surface can be pretreated by applying a primer on the damaged surface.

The primer can be applied by brushing or spraying.

The primer can be selected by the skilled person according to the substrate which has to be cleaned. For example, rubber gum solved in solvent is used as a primer for elastomeric surfaces.

Commercially available primers which can be used are SC 2000 or SC 4000 (available from REMA TipTop), WRM® Primer Rubber, WRM® Primer Urethane or WRM® Primer Metal (available from LANXESS).

In one embodiment of the present invention, no primer is applied to the prepared/damaged surface after step b). The lack of a "primer application" step makes the repair process easier and faster but may lead to bonding issues.

The mixing of part A and part B in step d) is typically done for 1 to 2 minutes, to form a curable composition.

In one embodiment of the present invention, the curable composition is applied on the abraded, cleaned substrate by using a spatula.

In one embodiment of the present invention, the curable composition is cured at room temperature. In another embody, the curable composition is cured at a temperature of 60 to 80° C.

Polyurethane

The invention is also directed to a polyurethane, obtainable by curing the parts of the curable composition of the present invention described above at a temperature of 15° C. or more, preferably 50 to 80° C. and more preferably at room temperature.

In one embodiment of the present invention, the polyurethane has a hardness of 50 to 95 Shore A, preferably 60 to 85 Shore A.

The hardness of the polyurethane can be measured according to ASTM D2240.

The curable composition prepared according to the process describe herein above is effective to repair damaged surfaces of substrate, in particular damaged surfaces of elastomeric substrate. Substrate which can be repaired comprise rubber, thermoplastics, polyurethanes, PVC, polyamide, fabric and various metals including steel.

The working time of the curable composition of the present invention is 3 minutes or more, preferably 3 to 20 minutes and more preferably 5 to 7 minutes. A short working time is advantageous, as it reduces the time to get the repaired equipment back to service.

Equipment repaired by the polyurethane of the present invention can return to service after 24 hours, preferably after 8 hours, more preferably after 5 hours and even more preferably after 3 hours.

The multi-part kit system of the present invention can be used for repairing damaged surfaces of equipment of industrial applications, preferably for repairing roll lagging, rolls, scrapers, shoot liners, conveyor belts, impellers, mill lining, lifter bars, rotors, stators, screen panels, wheels, tank liners, agitators, air evacuation fan or pump liners as well as marine applications. The multi-part kit system can be used for flat, curved and contoured damaged surfaces.

In one embodiment of the present invention, the substrate to be repaired is a conveyor belt based on a variety of rubber formulations.

The invention is also directed to equipment, preferably conveyor belts, coated with an inventive polyurethane as describe herein.

Polyurethane according to the present invention has improved hydrolytic stability and, thus, hot wet applications are possible.

Furthermore, polyurethane according to the present invention has an improved UV-stability and better color retention.

The polyurethane according to the present invention has a very high rebound (e.g. small particle impact abrasion resistance) and an excellent toughness build up.

Use

The invention is also directed to the use of the multi-part kit system of the present invention to repair a damaged surface of a substrate.

The thixotropic properties allow thick coatings to be applied to vertical surfaces or the underside of horizontal surfaces without falling off. The mixture can be worked with ease using trowels or other suitable tools.

The combination of low-free polyurethane prepolymers and particulate HQEE in a paste allows the use at room temperature and provides a material with the desired properties with reduced hazardousness.

The invention is also directed to the use of the multi-part kit system of the present invention to provide wear resistant coating to a damaged surface of a substrate.

EXAMPLES

Identity and vendor of commercial materials used in the examples:

| | |
|---|---|
| Adiprene ® L300 | TDI terminated polyether (polytetramethylene ether glycol; PTMEG) prepolymer; 4.15% NCO content; (commercially available at LANXESS) |
| Adiprene ® LFM E500 | MDI terminated polyether (polytetramethylene ether glycol; PTMEG) prepolymer; <0.1 wt % free MDI monomer content; 5.0% NCO content; (commercially available at LANXESS) |
| Adiprene ® LFM E370 | MDI terminated polyether prepolymer; <0.1 wt % free MDI monomer content; 3.70% NCO content; (commercially available at LANXESS) |
| Aerosil ® 200 | fumed silica (commercially available at Evonik) |
| Poly-Cure ® 1000 | 4,4'-methylene-bis(2-carbomethoxyaniline) (commercially available at PTM&W) |
| Vibracure ® 2101 | solid particulate hydroquinone di-(2-hydroxyethyl)ether (HQEE) (commercially available at LANXESS) |
| Mesamoll ® | plasticizer, alkylsulphonic phenyl ester; CAS Reg. No. 91082-17-6 (ASE) (commercially available at LANXESS) |
| PEG 200 | polyethylene glycol; Mw 200 g/mol (commercially available at Sigma Aldrich) |
| Catalyst | formulated catalyst composition comprising Vibracat ® MF (95% Benzoflex ™ 9-88 SG plasticizer and two tin catalysts 3.33% Niax ® A33 and 1.67% Niax ® A577) and bismuth catalyst BiCAT ® 8108 |

Testing Methods:

The hardness of the cured polyurethanes was measured according to ASTM D2240. Tensile strength, modulus and elongation at break were measured according to ASTM D412.

Die-C tear strength was tested according to ASTM D-624 (Die-C Tear).

Split tear strength was tested according to ASTM D470 (Split Tear).

TABLE 1

| Composition of the multi part kit system | | | |
|---|---|---|---|
| Example Nr | 1 | 2* | 3* |
| Part A | | | |
| A1) Prepolymer | 100 parts Adiprene ® L300 | 100 parts Adiprene ® LFM E500 | 100 parts Adiprene ® LFM E370 |
| A2) Fumed silica | 7 parts Aeorsil ® 200 | 7 parts Aeorsil ® 200 | 6 parts Aeorsil ® 200 |
| A3) Plasticizer | 10.5 parts Benzoflex | 22 parts Mesamoll | 22 parts Mesamoll |
| Part B | | | |
| B1) Curative | Poly-Cure ® 1000 | 11.0 parts Vibracure ® 2101 | 8 parts Vibracure ® 2101 |
| B2) Plasticizer | | 22 parts Mesamoll | 16 parts Mesamoll |
| Par tC | | | |
| C1) Polyol | 1.2 parts PEG 200 | 1.66 parts PEG 200 | 21.5 parts PEG 200 |
| C2) Catalyst | 0 parts | 5.36 parts Vibracat ® MF + BiCAT ® 8108 | 8.51 parts Vibracat ® MF + BiCAT ® 8108 |
| Properties | | | |
| Working time [min] | 30-45 | 5-10 | 5-10 |
| Return to service [h] | 24 | 3 | 3 |
| Tack free [min] | 200 | 45 | 45 |
| Tough [min] | 720 | 120 | 120 |
| Hardness [Shore A] | 80-83 | 75-85 | 60-70 |
| Full cure [h] | 48 | 12 | 12 |
| EHS properties | − | + | + |

*inventive example

The inventive compositions of example 2 and 3 have a significantly improved productivity (e.g. shorter working time) compared to the comparison example 1.

"Tack free" means that the top surface is no longer sticky to the touch.

"Tough" means that the material has some level of elongation and can be bent on top of itself without breaking.

The EHS properties of the inventive compositions of example 2 and 3 are advantageous (+) over the comparison example 1 (−). Part A of examples 2 and 3 comprises less free diisocyanate monomer than comparison example 1. Part B of examples 2 and 3 is non-hazardous.

TABLE 2

| Physical properties of polyurethanes based on compositions of Table 1 | | | |
|---|---|---|---|
| Example Nr. | 1 | 2* | 3* |
| 100% Mod [MPa] | 5.4 | 6 | 2 |
| Tensile Strength [MPa] | 12 | 11 | 11 |
| Elongation [%] | 335 | 495 | 730 |
| Die C Tear [KN/m] | 58 | 61 | 38 |
| Split Tear [KN/m] | 11 | 15 | |
| Hardness [Shore A] | 80 | 75-85 | 58-68 |
| DIN Abrasion | 120 | 87 | 165 |

*inventive example

What is claimed is:

1. A multi-part kit system, comprising:

a part A comprising (A1) MDI prepolymer, (A2) fumed silica, and (A3) a first plasticizer; and a part B comprising (B1) hydroquinone di-(2-hydroxyethyl) ether, and (B2) a second plasticizer; and a part C comprising (C1) polyol, (C2) a catalyst, and (C3) optionally, a third plasticizer, wherein the catalyst is a composition comprising a tin catalyst in a range of from 1 to 20 wt. % and plasticizer in a range of from 80 to 99 wt. %.

2. The system of claim 1, wherein the part A comprises (A1) the MDI prepolymer in a range of from 70 to 85 wt. %, (A2) the fumed silica in a range of from 2 to 10 wt. %, and (A3) the first plasticizer in a range of from 10 to 25 wt. %, based on a total weight of the part A, wherein the part B comprises (B1) the hydroquinone di-(2-hydroxyethyl)ether, in particulate form, in a range of from 25 to 50 wt. %, and (B2) the second plasticizer in a range of from 50 to 75 wt. %, based on a total weight of the part B, and wherein the part C comprises (C1) the polyol in a range of from 10 to 35 wt. %, (C2) the catalyst in a range of from 2 to 15 wt. %, and (C3) optionally, the third plasticizer in a range of from 10 to 75 wt. %, based on a total weight of the part C.

3. The system of claim 1, wherein the part A comprises (A1) the MDI prepolymer in a range of from 75 to 80 wt % (A2) the fumed silica in a range of from 3 to 7 wt. %, and (A3) the first plasticizer in a range of from 13 to 17 wt. %, based on a total weight of the part A; and wherein the part B comprises (B1) the hydroquinone di-(2-hydroxyethyl) ether, in particulate form, in a range of from 28 to 38 wt. %, and (B2) the second plasticizer in a range of from 62 to 72 wt. %, based on a total weight of the part B; and wherein the part C comprises (C1) the polyol in a range of from 20 to 26 wt. %, (C2) the catalyst in a range of from 20 to 28 wt. %, and (C3) optionally, the third plasticizer in a range of from 30 to 50 wt. %, based on a total weight of the part A.

4. The system of claim 1, wherein the part A comprises free 4,4'-methylene diphenyl diisocyanate monomer in less than 1 wt. %, based on a total weight of the MDI prepolymer.

5. The system of claim 1, consisting of:

the part A, the part B, and the part C.

6. The system of claim 1, wherein a weight ratio of the part A to the part B to the part C is in a range of from 100:15:1 to 100:50:15.

7. The system of claim 1, wherein the MDI prepolymer comprises, in reacted form, 4,4'methylene diphenyl diisocyanate and polytetramethylene ether glycol.

8. The system of claim 1, wherein the hydroquinone di-(2-hydroxyethyl) ether (B1) is solid and present in ground form.

9. The system of claim 1, wherein the hydroquinone di-(2-hydroxyethyl) ether (B1) has a particle diameter D90 of less than 90 micrometer, measured according to ASTM E2651.

10. The system of claim 1, wherein the first plasticizer (A3), the second plasticizer (B2), and/or the third plasticizer (C3) is alkylsulfonic phenyl ester.

11. The system of claim 1, wherein the first plasticizer (A3), the second plasticizer (B2), and the third plasticizer (C3) are the same.

12. The system of claim 1, wherein the polyol (C1) is a polyethylene glycol having a molecular weight in a range of 180 to 220 g/mol.

13. The system of claim 1, wherein the composition of the catalyst (C2) comprises the third plasticizer, in a range of from 90 to 99 wt. %, and the tin catalyst, in a range of from 1 to 10 wt. %.

14. A process for preparing a curable composition, the process comprising:

mixing all parts of the multi-part kit system of claim 1.

15. A curable composition, comprising:

the parts A, B, and C of the multi-part kit system of claim 1.

16. A polyurethane, in cured form:

the curable composition of claim 15, cured at a temperature of 15° C. or more, as a cured polyurethane.

17. The polyurethane of claim 16, wherein the cured polyurethane has a hardness of 50 to 95 Shore A, 60 to 85 Shore A, measured according to ASTM D2240.

18. A process to repair a damaged surface, the process comprising:

(a) abrading an area of a substrate to be repaired, to provide an abraded substrate;

(b) cleaning a surface of the area of the abraded substrate, using a solvent, to provide an abraded, cleaned substrate;

(c) optionally, applying a primer to the surface of the abraded, cleaned substrate;

(d) mixing the part A and the part B, of claim 1, to form a curable composition;

(e) optionally, mixing the part C, with the curable composition from the mixing (d);

(f) applying the curable composition of the mixing (d) or (e) onto the surface of the abraded, cleaned substrate, to obtain an applied curable composition; and (h) curing the applied curable composition at a temperature of 15° C. or more.

19. Equipment, comprising, coated thereon:

the polyurethane of claim 16.

20. A method of repairing a damaged surface of a substrate, the method comprising:

contacting the multi-part kit system of claim 1 with the damaged surface.

* * * * *